US008305065B2

(12) United States Patent
Sase et al.

(10) Patent No.: US 8,305,065 B2
(45) Date of Patent: Nov. 6, 2012

(54) POWER SUPPLYING APPARATUS INCLUDING A PULSE-WIDTH MODULATION OSCILLATOR AND SMOOTHING FILTERS

(75) Inventors: Takashi Sase, Hitachi (JP); Akihiko Kanouda, Hitachinaka (JP); Yosuke Tsuyuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 819 days.

(21) Appl. No.: 12/370,640

(22) Filed: Feb. 13, 2009

(65) Prior Publication Data
US 2010/0026262 A1 Feb. 4, 2010

(30) Foreign Application Priority Data

Jul. 30, 2008 (JP) ................................. 2008-195612

(51) Int. Cl.
*G05F 1/00* (2006.01)
(52) U.S. Cl. ......... 323/284; 323/283; 323/285; 323/286
(58) Field of Classification Search .................. 323/282, 323/283, 284, 285, 286
See application file for complete search history.

(56) References Cited

U.S. PATENT DOCUMENTS

| 5,617,016 | A | 4/1997 | Borghi |
| 5,731,731 | A | 3/1998 | Wilcox |
| 7,576,529 | B2 * | 8/2009 | Ishino ........................... 323/284 |
| 7,990,122 | B2 * | 8/2011 | Sase et al. ..................... 323/283 |
| 2005/0127881 | A1 * | 6/2005 | Sase et al. ..................... 323/225 |
| 2005/0127886 | A1 * | 6/2005 | Sase et al. ..................... 323/282 |
| 2010/0026256 | A1 * | 2/2010 | Liu et al. ....................... 323/282 |

FOREIGN PATENT DOCUMENTS

| JP | 08340670 | 12/1996 |
| JP | 2004-080985 | 3/2004 |
| JP | 2005-184870 | 7/2005 |
| JP | 2007-020315 | 1/2007 |
| JP | 2007-020352 | 1/2007 |
| JP | 2008-113542 | * 5/2008 |

OTHER PUBLICATIONS

Linear Technology LTC3410, 2.25MHz, 300Ma Synchronous Step-Down Regulation in SC70, published in 2005. English translation.

* cited by examiner

*Primary Examiner* — Gary L Laxton
*Assistant Examiner* — Lakaisha Jackson
(74) *Attorney, Agent, or Firm* — Antonelli, Terry, Stout & Kraus, LLP.

(57) ABSTRACT

A first-order feedback control power supply apparatus being arranged in such a manner that when the apparatus is driven under light load condition, a current flowing through an inductor is detected by employing a second CR smoothing filter; when the present load condition is judged as a light load condition based upon the detected inductor current, both upper-sided/lower-sided power MOSFETs and a PWM oscillator are turned OFF so as to be brought into sleep states; when an output voltage of the power supply apparatus is lowered and the lowered output voltage reaches a lower limit threshold of a transient variation detecting circuit, the upper-sided power MOSFET is turned ON to recover the output voltage; and when the output voltage of the power supply voltage reaches a predetermined voltage, the upper-sided power MOSFET is turned OFF so as to be again brought into the sleep state.

4 Claims, 10 Drawing Sheets

| COMPARISON LEVELS | | $\alpha 0$ | $\alpha 100$ | PWM Duty |
|---|---|---|---|---|
| VoCR | Vref'+Δ ↕ Vref'-Δ | L | L | (a) 0% (ABRUPT DECREASE) |
| | | H | L | (b) DESIRABLE DUTY RATIO "$\alpha$" (STEADY STATE) |
| | | H | H | (c) 100% (ABRUPT INCREASE) | ns
POWER SUPPLYING APPARATUS INCLUDING A PULSE-WIDTH MODULATION OSCILLATOR AND SMOOTHING FILTERS

BACKGROUND OF THE INVENTION

1. Field of the Invention

The present invention generally relates to a power supply apparatus. More specifically, the present invention is directed to an improvement in efficiencies when a first-order feedback control power supply (virtual title) is driven under light load condition, and moreover, is directed to control technology capable of realizing compatibility between light load driving of the first-order feedback control power supply apparatus and a fast response thereof which constitutes the feature of the first-order feedback control power supply apparatus.

2. Description of the Related Art

As to improvements in efficiencies when power supply apparatuses are driven under light load conditions, various sorts of examples have been proposed in which these power supply apparatuses are driven in a burst mode, a voltage mode, a ripple mode, and other modes. In an example as to the above-described burst mode, a current flowing through an inductor is detected; if a power supply apparatus is driven under light load condition, then burst operations are repeatedly carried out for several cycles so as to gradually recover an output voltage of this power supply apparatus; and thus, the power supply apparatus is brought into a sleep state. At this time, since upper-sided and lower-sided power MOSFETs and an unnecessary circuit have been turned OFF, electric power is supplied to the load by utilizing energy stores in an output capacitor. As a result, although control power of the power supply apparatus is low, there is such a drawback that switching losses of the upper-sided/lower-sided power MOSFETs become large. This technical idea has been disclosed in Linear Technology Data Sheet "LTC 3410."

Next, in an example as to the above-described voltage mode, when the power supply apparatus is driven under the light load condition, both upper-sided/lower-sided power MOSFETs are turned ON/OFF in a complementary manner only one time so as to recover an output voltage of the power supply apparatus; and at such a timing that a midpoint voltage between the upper-sided/lower-sided power MOSFETs is changed from a minus voltage to a plus voltage when the lower-sided power MOSFET is turned OFF, the power supply apparatus is brought into a sleep state. At this sleep time, only the upper-sided and lower-sided power MOSFETs are turned OFF. As a result, although switching losses may be caused by turning ON/OFF both the upper-sided/lower-sided power MOSFETs only one time, the below-mentioned drawback of high control power may occur. That is, a control circuit is normally operated in order to detect the midpoint voltages between the upper-sided and lower-sided power MOSFETs, so that the control power of this control circuit becomes high. These technical ideas have been disclosed in JP-A-2007-20315.

Also, in an example as to the above-described ripple mode, when the power supply apparatus is driven under the light load condition, both upper-sided/lower-sided power MOSFETs are repeatedly turned ON/OFF in a complementary manner so as to gradually recover an output voltage of the power supply apparatus until the output voltage of the power supply apparatus reaches from a lower limit threshold voltage of a ripple width up to an upper limit threshold voltage thereof; and at such a timing that a midpoint voltage between the upper-sided/lower-sided power MOSFETs is changed from a minus voltage to a plus voltage when the lower-sided power MOSFEET is turned OFF, the power supply apparatus is brought in to a sleep state. At this sleep time, only the upper-sided and lower-sided power MOSFETs are turned OFF. As a result, there is such a drawback that both switching losses and control power become large. These technical ideas have been disclosed in JP-A-2007-20352.

SUMMARY OF THE INVENTION

The present invention has been made to solve the above-described drawbacks of the conventional techniques, and therefore, has an object to provide a first-order feedback control power supply apparatus capable of reducing both a switching loss and control power in order to improve an efficiency when the first-order feedback control power supply apparatus is driven under light load condition.

Also, another object of the present invention is to secure compatibility as to the efficiency improving operation when the first-order feedback control power supply apparatus is driven under the light load condition, and the fast response which constitutes the feature of the first-order feedback control power supply apparatus.

Furthermore, since the technical idea of the present invention is applied to a digital control power supply apparatus, an improvement in efficiencies when the digital control power supply apparatus is driven under light load condition may be realized.

The present invention has the most important feature as follows: In a first-order feedback control power supply apparatus, current flowing through an inductor is detected by employing a second CR smoothing filter; when the present load is judged as a light load based upon the detected inductor current, both upper-sided and lower-sided power MOSFETs, and an unnecessary circuit (for instance, PWM oscillator) of a control unit are turned OFF so as to be brought into sleep states. Then, when an output voltage of the power supply apparatus is decreased and then reaches a lower limit threshold of the transient variation detecting circuit, the upper-sided power MOSFET is turned ON so as to recover the output voltage of the power supply apparatus; and when the recovered output voltage thereof reaches a predetermined voltage, this upper-sided power MOSFET is turned OFF so as to be again brought into the sleep state. As a consequence, the present invention is featured in such a manner that the fast response corresponding to the feature of the first-order feedback control power supply apparatus is not deteriorated.

Also, the present invention is featured by that since the above-described control method is realized by executing a control algorithm, the inventive idea of the present invention is applied to such a digital control power supply apparatus having a fast response.

In accordance with the present invention, when the power supply apparatus is driven under the light load condition, the output voltage thereof can be recovered by turning ON the upper-sided power MOSFET only 1 time. As a result, the switching losses of the upper-sided/lower-sided power MOSFETs can be minimized, and furthermore, since the PWM oscillator and other circuits provided in the control unit are turned OFF (stopped), the control power thereof can be decreased in the largest degree.

Also, since the fast response of the power supply apparatus is not deteriorated which is applied to the power reduction under the light load operation, there is such a merit of achieving compatibility, namely, an efficiency can be improved due to power saving effects achieved when the power supply apparatus is driven under the light load condition, and furthermore, the fast response can be secured.

In addition, in accordance with the technical idea of the present invention, since this technical idea is applied to a digital control operation in a digital power supply apparatus, the following merits may be obtained: That is, a setting value may be easily tuned to such a point at which the highest power saving level may be expected during a light load driving condition, so that a higher power saving effect by the digital control operation may be expected, as compared with that of the analog control operation.

DETAILED DESCRIPTION OF THE INVENTION

A basic idea as to embodiments of the present invention will now be simply described.

A power supply apparatus to which an inventive idea of the present invention is applied is featured as follows: That is, in a power supply apparatus of a step-down type DC-to-DC converter, such a first-order feedback control power supply apparatus is realized in which a fast response loop formed by a transient variation detecting circuit when a load is suddenly changed has been separately provided parallel to the normal steady control loop. In this power supply apparatus of the step-down type DC/DC converter, a current flowing through an inductor is detected by employing a second CR smoothing filter; when the present load is judged as a light load based upon the detected inductor current, both upper-sided and lower-sided power MOSFETs, and an unnecessary circuit (for instance, PWM oscillator) of a control unit are turned OFF so as to be brought into sleep states. Then, when an output voltage of the power supply apparatus is decreased and reaches a lower limit threshold value of the transient variation detecting circuit, the upper-sided power MOSFET is turned ON so as to recover the output voltage of the power supply apparatus; and when the recovered output voltage thereof reaches a predetermined voltage, this upper-sided power MOSFET is turned OFF so as to be again brought into the sleep state. As a consequence, since the recovery operation to the predetermined voltage as to the output voltage can be realized by turning ON the upper-sided power MOSFET only 1 time, switching losses thereof may be minimized, and furthermore, the steady control loop is not similarly operated. As a result, the reduction of the control power can be improved, and compatibility between efficiency improvements during the light load driving operation by the power saving, and a fast response can be realized.

Also, since the above-described method when the power supply apparatus is driven under the light load condition is realized by executing a control algorithm, this method can be applied to a fast response digital control type power supply apparatus.

Referring now to drawings, a description is made of respective embodiments of the present invention.

Embodiment 1

Figure 1:
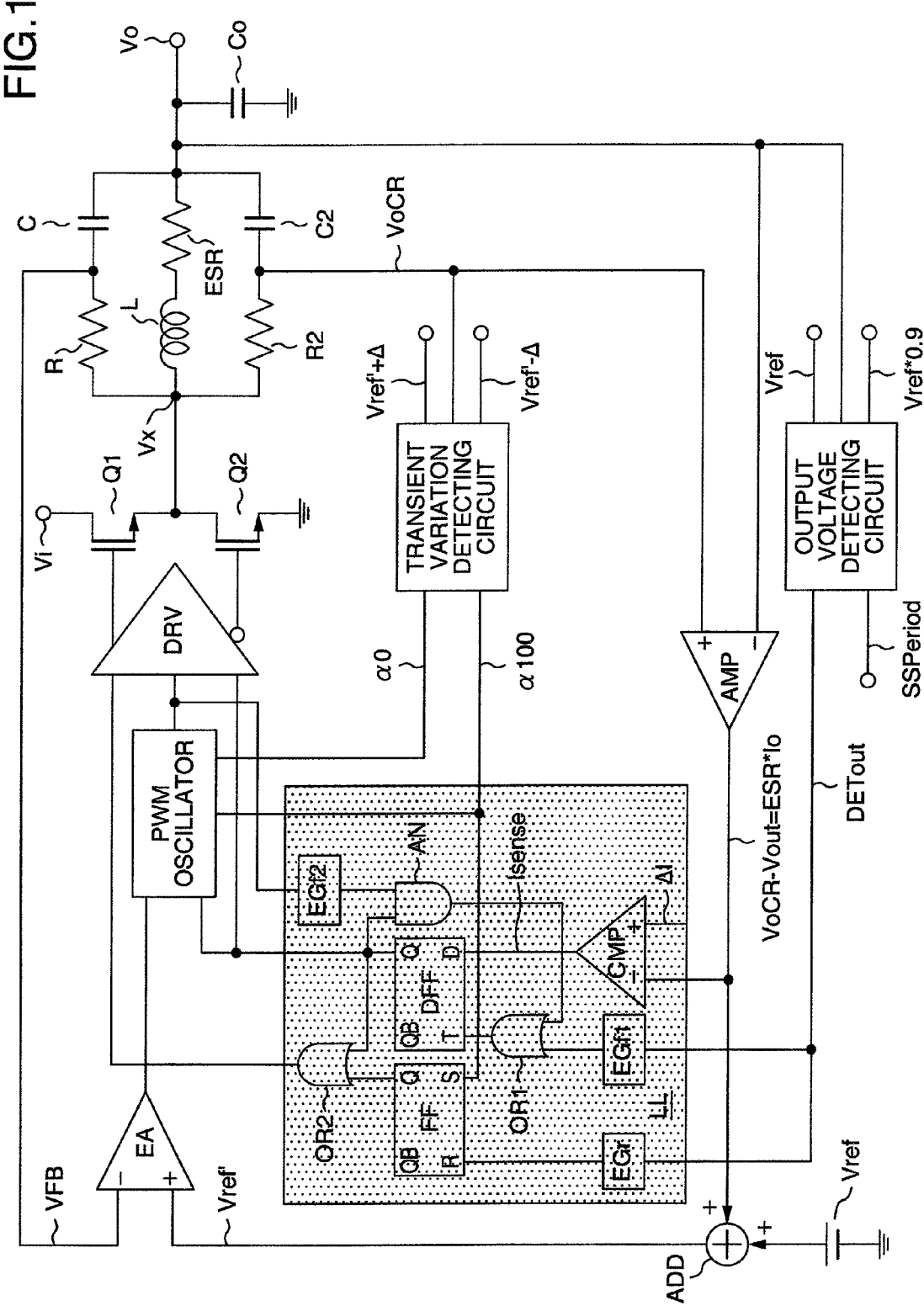
FIG. 1 is a circuit block diagram of a power supply apparatus according to an embodiment 1 of the present invention.

A circuit diagram of a power supply apparatus according to an embodiment 1 of the present invention is indicated in FIG. 1. In FIG. 1, symbol "Vi" shows an input terminal, and symbol "Vo" indicates an output terminal. An upper-sided power MOSFET (Q1) is connected to the input terminal "Vi", and a lower-sided power MOSFET (Q2) is connected to the ground side. An LC smoothing filter is connected to a midpoint between the power MOSFETs (Q1) and (Q2), while the LC smoothing filter corresponds to a power series output filter constructed by employing an inductor "L" and a capacitor "Co." Then, a first CR smoothing filter arranged by a resistor "R" and a capacitor "C" and a second CR smoothing filter arranged by a resistor "R2" and a capacitor "C2" are connected in a parallel manner between both terminals of the inductor "L" of the LC smoothing filter. In addition, the output terminal Vo, one input "(−)" of a differential amplifier "AMP" and an input of an output voltage detecting circuit "VODET" are connected to a midpoint of the LC smoothing filter; and one input "(−)" of an error amplifier "EA" is connected to a midpoint of the first CR smoothing filter; and an input of a transient variation detecting circuit "TVD" and the other input "(+)" of the differential amplifier "AMP" are connected to a midpoint of the second CR smoothing filter. In this case, it should be understood that an equivalent series resistance "ESR" internally contained in the above-described inductor "L" has been illustrated in order to be utilized in the below-mentioned description.

Also, a new reference voltage "Vref" is connected to the other input "(+)" of the error amplifier "EA", while the new reference voltage "Vref" is produced by adding a reference voltage "Vref" to the output voltage of the differential amplifier "AMP" by an adder "ADD." The gates of the power MOSFETs (Q1) and (Q2) are connected to the output of the error amplifier "EA" via a pulse-width modulation (will be abbreviated as "PWM" hereinafter) oscillator, and a driver "DRV." The power MOSFETs (Q1) and (Q2) are driven in a reversed phase mode, so that these power MOSFETs (Q1)

and (Q2) are alternately conducted. In the embodiment 1, an output voltage "Vout" of the output terminal "Vo" is lower than an input voltage "Vin" of the input terminal "Vi."

Also, a midpoint voltage of the second CR smoothing filter constituted by the capacitor C2 and the resistor R2, and two voltages generated by adding upper and lower voltage widths "±Δ" with respect to the new reference voltage "Vref'" are connected to a plurality of inputs of the transient variation detecting circuit TVD, whereas either a signal "α0" or another signal "α100" is connected to the output of the transient variation detecting circuit TVD.

The above-described signal "α0", or "α100" forcibly controls a duty ratio of the PWM oscillator "PWM" by detecting a transient load variation based upon a high/low relationship of these input voltages by the transient variation detecting circuit TVD.

Also, a midpoint voltage of the LC smoothing filter, the reference voltage "Vref", and another reference voltage "Vref*0.9" (namely, 90% voltage of reference voltage "Vref") are connected to a plurality of inputs of the output voltage detecting circuit "VODET", whereas a soft start circuit (not shown) is connected to an out "SSPeriod" of the output voltage detecting circuit VODET. The soft start circuit is employed in order that an output voltage of the power supply apparatus is gently raised to a predetermined voltage (in this example, reference voltage "Vref" is employed) in a power supply start mode. For instance, in the power supply apparatus of the present invention, an action caused by the output signal "α100" of the transient variation detecting circuit TVD during the power supply starting period is prohibited. The above-described circuit arrangement corresponds to a basic arrangement of the first-order feedback control power supply apparatus.

Next, a description is made of such a circuit (will be referred to as "light load efficiency improvement circuit LL" hereinafter) added to the basic arrangement of the first-order feedback control power supply apparatus in order to improve an efficiency when the power supply apparatus is driven under light load condition. The above-described light load efficiency improvement circuit "LL" is arranged by an RS type flip-flop "FF", a D type flip-flop "DFF", a comparator "CMP", a light load setting voltage "Dl", a rising edge pulse generating circuit "EGr", falling edge pulse generating circuits "EGf1" and "EGf2", OR gates OR1 and OR2, and an AND gate "AN."

Then, the output signal "a100" of the transient variation detecting circuit TVD is connected to one input "S" of the RS type flip-flop "FF"; an output "DETout" of the output voltage detecting circuit VODET is connected via the rising edge pulse generating circuit "EGr" to the other input "R" of the RS type flip-flop "FF"; and furthermore, the driver "DRV" is connected via the OR gate "OR2" to one output "Q" of the RS type flip-flop "FF."

Also, the output DETout of the output voltage detecting circuit VODET is connected via the falling edge pulse detecting circuit "EGf1" to one input "T" of the D type flip-flop DFF; and the output of the PWM oscillator "PWM" is connected via the falling edge pulse detecting circuit "EGf2" and the AND gate "AN" to the OR gate "OR1." An output of the comparator "CMP" is connected to the other input "D" of the D type flip-flop DFF; the output of the differential amplifier "AMP" is connected to one input "(−)" of the comparator "CMP"; and the light load setting voltage "ΔI" is connected to the other input "(+)" of the comparator CMP. In addition, the driver "DRV", the PWM oscillator "PWM", the OR gate "OR2", and the AND gate "AN" are connected to an output "Q" of the D type flip-flop DFF, respectively.

Next, a description is made of operations as to the circuit of the power supply apparatus shown in FIG. 1. A first description is made of operations of a steady state under no load condition (in case of such a condition "(Vref'+Δ)>VoCR>(Vref'−Δ)" of FIG. 3(b), and will be explained later). In this case, the circuit operation is an operation of a control loop constituted by the first CR smoothing filter, the error amplifier "EA", the PWM oscillator "PWM", and the driver "DRV." An input voltage applied to the input terminal "Vi" is converted into another voltage "VFB" via the CR smoothing filter by controlling turning-ON/OFF operations of both the upper-sided power MOSFET (Q1) and the lower-sided power MOSFET (Q2). This converted voltage "VFB" is compared with the new reference voltage "Vref'" (this reference voltage value is equal to reference voltage "Vref" under no load condition) in the error amplifier EA to produce an error voltage, and the error voltage is amplified to produce the amplified error voltage from the output of the error amplifier EA. The resulting error voltage is converted into a PWM pulse by the PWM oscillator "PWM." The PWM pulse is converted into an on-off time ratio (duty ratio: "α") at which both the upper-sided power MOSFET (Q1) and the lower-sided power MOSFET (Q2) are driven by the driver DRV. Then, the on-off time ratio "α" is used so as to perform a negative feedback control in order that the error voltage becomes zero, so that the converted voltage "VFB" may become equal to the new reference voltage "Vref'." In this case, under the steady state, the converted voltage VFB obtained through the CR smoothing filter is directly proportional to the duty ratio "α" of the input voltage Vin. As a consequence, such a related formula may be established:

VFB=Vref'=Vref=α×Vin. In this case, since the above-described duty ratio "α" is defined by "on time/(summation of on time and off time)", this duty ratio "α" has any value between 0 and 1.

In the case of a normal step-down type converter, since it is apparent that a voltage conversion ratio under steady state is equal to a ratio of an input voltage to an output voltage, namely, a duty ratio, an output of the LC smoothing filter, namely, an output voltage "Vout" obtained from the output terminal "Vo" may be calculated based upon such a related formula of "Vout=α×Vin", assuming now that the input voltage is "Vin", and the duty ratio is "α."

Based upon the above-explained two formulae, such a relationship of "Vout=Vref=α×Vin" can be established. As a consequence, even when the output voltage is not controlled by directly feeding back the output of the LC smoothing filter, if the duty ratio "α" can be indirectly controlled by conducting another method, then this indirect control operation may be equivalent to such a control operation that the output voltage Vout of the output terminal Vo is directly controlled, so that a voltage which is directly proportional to the duty ratio "α" of the input voltage "Vin" may be obtained from the output terminal "Vo." In other words, since the power MOSFETs (Q1) and (Q2) are driven so as to control the output of the CR smoothing filter in the negative feedback control manner, such a desirable voltage which is directly proportional to the duty ratio "a" of the input voltage "Vin" can be obtained as the output voltage "Vout" even in the output of the LC smoothing filter.

However, the above-described operation relationship can be established as long as the no load condition can be maintained. If a load current "Io" flows in the power supply apparatus, then a voltage drop is produced due to the equivalent series resistance "ESR" of the inductor "L", so that the below-mentioned phenomenon may occur: That is, an output voltage (averaged voltage value) "Vout'" (this output voltage Vout' is also referred to as converted voltage "VFB") of the first CR smoothing filter is not equal to the output voltage "Vout" obtained from the output terminal "Vo." In other words, since the output voltage "Vout'" of this first CR smoothing filter is controlled, the output voltage "Vout" of the output terminal "Vo" becomes equal to such a voltage which is lower than the output voltage "Vout" by a difference voltage (ESR×Io). As a result, in order to eliminate such a load current depending characteristic caused by the equivalent series resistance "ESR" of the inductor "L", this voltage drop can be compensated by applying the below-mentioned voltage as the new reference voltage "Vref" to the other input (+) of the error amplifier "EA." The above-described voltage is produced by adding the difference voltage (ESR×Io) to the original reference voltage "Vref." Concretely speaking, as the new reference voltage "Vref'", such a difference voltage (ESR×Io) is derived from an output voltage "VOCR" of the second CR smoothing filter and the output voltage "Vout" of the output terminal "Vo" by employing the differential amplifier "AMP", and thereafter, this difference voltage (ESR×Io) is added to the reference voltage "Vref" by the adder "ADD", so that this added voltage is employed as the new reference voltage "Vref'." As a result, even when the load current "Io" is changed, the output voltage "Vout" obtained at the output terminal "Vo" may be continuously made equal to the original reference voltage "Vref."

Next, a description is made of operations when a transient load of the power supply apparatus is varied (namely, during abrupt load change). As a control method when a load is abruptly changed, the below-mentioned control method is employed. That is, the transient variation detecting circuit TVD is employed so as to detect an operation status of an output voltage Vout and to judge whether the detected operation status corresponds to a steady state, or an abrupt load change state based upon a relationship between the output voltage VOCR of the second CR smoothing filter and the voltages obtained by adding the upper and lower voltage widths "±Δ" to the new reference voltage "Vref'." Then, the transient variation detecting circuit TVD switches the present control operation to such a control operation which can be adapted to the judged operation status. In this case, the reason why the abrupt change of the output voltage Vout is observed at the output voltage VoCR of the second CR smoothing filter is given by the following technical idea: Since the change contained in the output voltage Vout is transferred via the capacitor C2 to the output voltage VoCR of the second CR smoothing filter (in this case, since second CR smoothing filter may be seen as differentiation circuit from output terminal Vo), even if the output voltage VoCR of the second CR smoothing filter is employed, the change of the output voltage Vout may be detected as follows:

(a) A condition of "VoCR≧(Vref'+Δ)" corresponds to such a case that a load current is abruptly decreased, so that the output voltage "Vout" is increased (sudden decrease in load), and thus, as an action thereof, the output duty ratio "α" of the PWM oscillator "PWM" is forcibly set to 0%. As a result, since the upper-sided power MOSFET (Q1) is turned OFF and the lower-sided power MOSFET (Q2) is turned ON, the output voltage Vout is abruptly decreased so as to suppress the variation of the output voltage Vout.

(b) A condition of "(Vref'+Δ)>VoCR>(Vref'−Δ)" corresponds to an operation of the steady state. Accordingly, as previously explained, the output duty ratio "α" of the PWM oscillator "PWM" is controlled based upon such a ratio of "(Vout'/Vin)."

(c) A condition of "VoCR≦(Vref'−Δ)" corresponds to such a case that a load current is suddenly increased, so that the output voltage Vout is decreased (sudden increase in load), and thus, the output duty ratio "α" of the PWM oscillator "PWM" is set to 100%. As a result, since the upper-sided power MOSFET (Q1) is turned ON and the lower-sided power MOSFET (Q2) is turned OFF, the output voltage Vout is abruptly increased so as to suppress the variation of the output voltage Vout.

A concrete description is made of switching operations with respect to the above-described operation conditions (a), (b), (c) by employing the detailed transient variation detecting circuit TVD and one embodiment of the PWM oscillator "PWM."

Figures 2, 3:
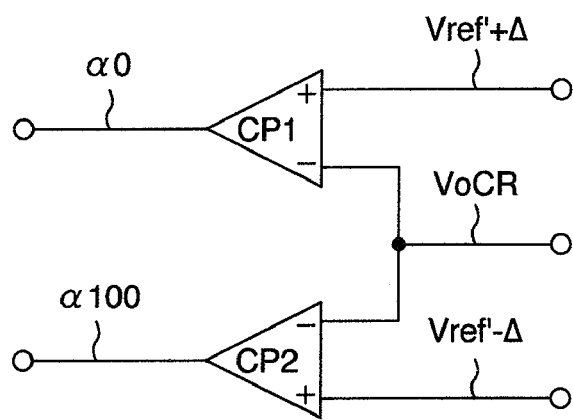
FIG. 2 is a detailed circuit diagram for showing a transient variation detecting circuit employed in the power supply apparatus of FIG. 1.
FIG. 3 is a diagram for indicating operation status modes of the transient variation detecting circuit shown in FIG. 2.

FIG. 2 is a detailed circuit diagram of the transient variation detecting circuit TVD shown in FIG. 1. The transient variation detecting circuit TVD is arranged by two comparators "CP1" and "CP2", and these comparators "CP1" and "CP2" are employed as a window comparator. Based upon a large/small relationship between the voltage VoCR and the upper/lower voltage widths "±Δ", state information shown in FIG. 3 is obtained in an output "α0" and another output "α100." The state information of the output "α0" and the state information of the output "α100" are inputted to the one-shot multivibrator "OSM" shown in FIG. 4, and to the PWM oscillator "PWM" which is arranged by a V/I converter (not shown) for converting an output voltage of the error amplifier EA into a current, and an oscillator (not shown). Results of the state information (a), (b), (c) of FIG. 3 are obtained from an output "φ" of FIG. 4.

Figure 4:
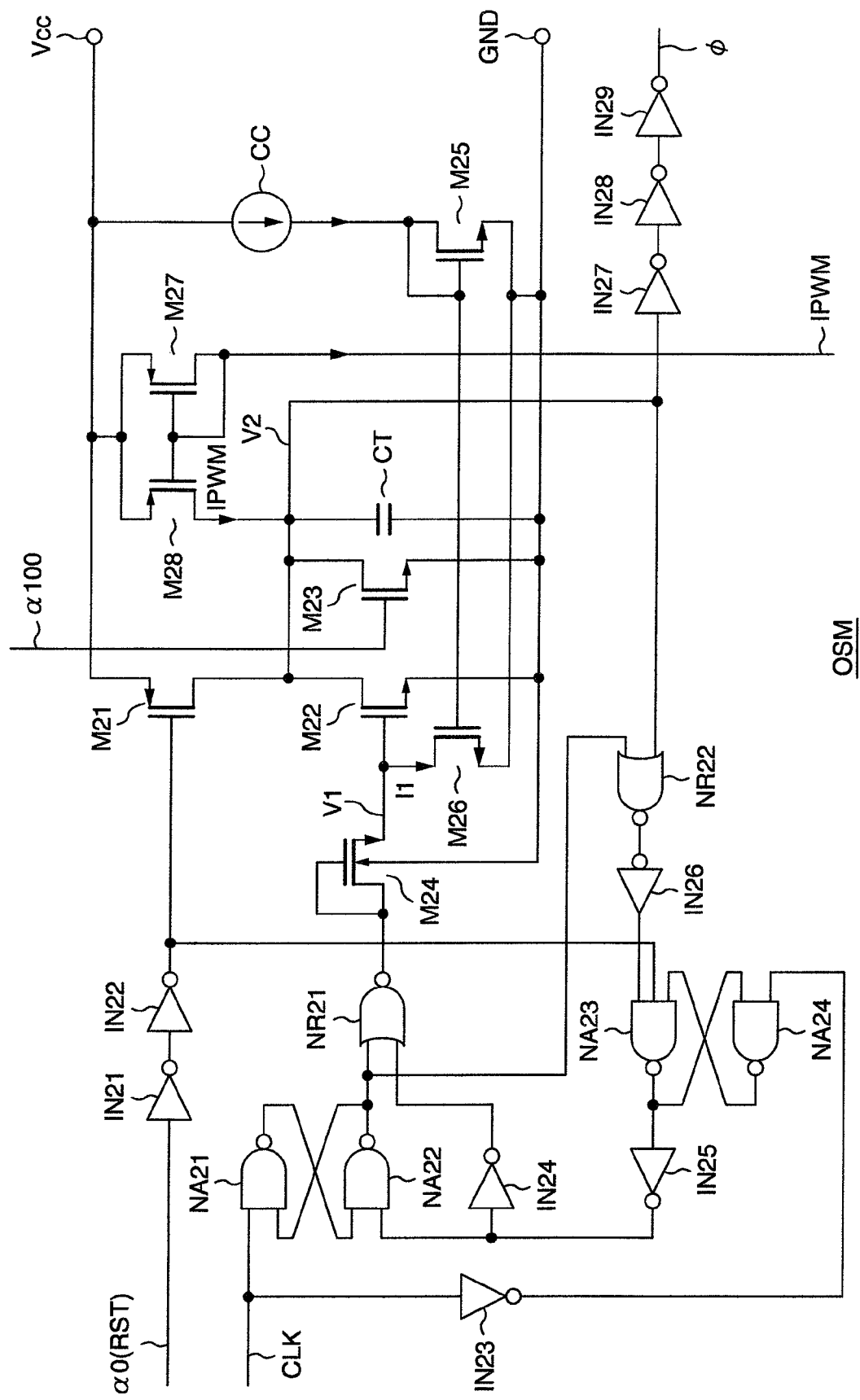
FIG. 4 is a detailed circuit diagram for showing an one-shot multivibrator employed in a PWM oscillator "PWM" within the power supply apparatus of FIG. 1.

Namely, in the case of the state information (a), since the output "α0" is selected, a voltage "V2" indicated in FIG. 4 becomes a power supply voltage "Vcc", so that "L" is outputted from the output "φ" of FIG. 4. As a result, the upper-sided power MOSFET (Q1) is turned OFF, and the lower-sided power MOSFET (Q2) is turned ON.

Figure 5:
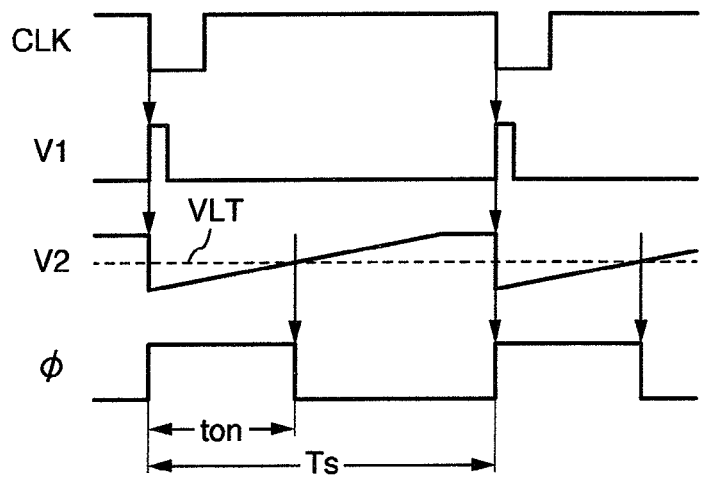
FIG. 5 is a diagram for representing operations of the one-shot multivibrator shown in FIG. 4.

In the case of the state information (b), since the outputs "α0" and "α100" do not give any change in the output "φ" of FIG. 4, such a PWM pulse having a desirable duty ratio "α" as obtained in operating waveforms of FIG. 5 based upon a current "IPWM" produced by converting the output voltage of the error amplifier EA via the V/I converter (not shown) is outputted from the output "φ" of FIG. 4. As a result, the upper-sided/lower-sided power MOSFETs (Q1) and (Q2) are operated in response to the PWM pulse having the desirable duty ratio "α." In this case, a clock "CLK" oscillated by the oscillator is employed as a switching period "Ts."

In the case of the state information (c), since the output "α100" is selected, the voltage "V2" indicated in FIG. 4 becomes the ground potential "GND", so that "H" is outputted from the output "φ" of FIG. 4. As a result, the upper-sided power MOSFET (Q1) is turned ON, and the lower-sided power MOSFET (Q2) is turned OFF.

Since the above-described power supply control system of the present invention is featured by the first-order lag control method with employment of the CR smoothing filter in the control loop as the voltage converting means based upon the duty ratio control operation for the upper-sided power MOSFET (Q1) and the lower-sided power MOSFET (Q2), there is no second-order lag of the LC smoothing filter (second-order lag has occurred in conventional technology), and the control loop does not constitute an oscillation system. As a result, no oscillation waveform is produced in the output, so that the control loop becomes stable. As a consequence, in accordance with the above-explained embodiment 1, even when such a chip ceramic capacitor having a small equivalent resistance "ESR" is used as the capacitor of the LC smoothing capacitor, the control loop may be stabilized. This feature is originally realized by the first-order feedback control system.

Also, when the load is abruptly changed, the variations of the output voltages can be forcibly suppressed by the transient control loop as much as possible, so that the power supply apparatus of the embodiment 1 can have a superior fast response in the abrupt load change. As a consequence, the present power supply control system may correspond to such a power supply apparatus which is operable by realizing compatibility as to the stability of the steady loop and the fast response. It should also be understood that since detailed descriptions have been made of the circuit and the operations as to the first-order feedback control power supply apparatus in JP-A-2004-080985 and JP-A-2005-184870, more information may be obtained from these descriptions.

Figure 6:
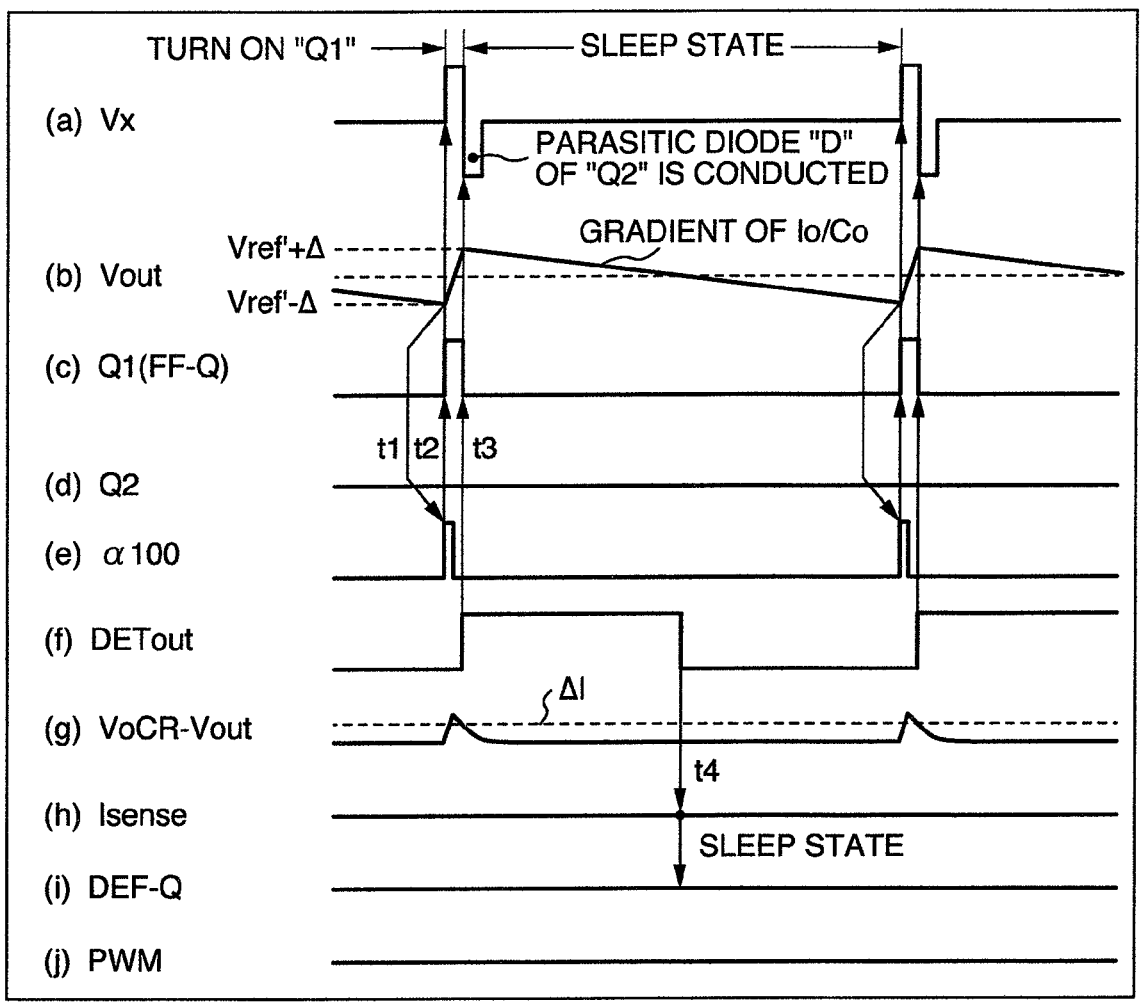
FIG. 6 is a diagram for indicating operations when the power supply apparatus is driven under light load condition.

Next, a description is made of operations when the power supply apparatus of the embodiment 1 is driven under light load condition. The above-described operations will now be explained with reference to the embodiment 1 of FIG. 1 and operation timing waveforms shown in FIG. 6. Assuming now that the power supply apparatus is presently under sleep state when this power supply apparatus is driven under light load condition, as represented in FIG. 6(c), FIG. 6(d), and FIG. 6(j), since both the upper-sided and lower-sided power MOSFETs (Q1) and (Q2) have been turned OFF (stopped) and the PWM oscillator "PWM" has been turned OFF (stopped), a supply of electric power to the light load is carried out by utilizing such an energy which has been stored in the output capacitor "Co" of the LC smoothing filter. As a consequence, assuming that a load current is "Io" and a capacitance of the output capacitor Co is "Co", a terminal voltage (namely, output voltage Vout) of the output capacitor Co is decreased with such an inclination defined by Io/Co as represented in FIG. 6(b). As viewed at the output VoC of the second CR smoothing filter, if the decreased output voltage Vout reaches a lower limit threshold value (Vref'-Δ) of the transient variation detecting circuit TVD, then the output α100 of the transient variation detecting circuit TVD is changed from "L" to "H" (at timing "t1" of FIG. 6(e)). If this status change is entered to the input "S" of the RS type flip-flop "FF", then the output "Q" of the RS type flip-flop "FF" is set from "L" to "H" (at timing "t2" of FIG. 6(c)) which turns ON the upper-sided power MOSFET (Q1) via the OR gate OR2 and the driver DRV (refer to FIG. 6(c)). As a result, since the output voltage Vout is increased as represented in FIG. 6(b), the output DETout of the output voltage detecting circuit VODET for comparing the output voltage Vout with a predetermined voltage (reference voltage "Vref" in this case) is changed from "L" to "H" (refer to FIG. 6(f)). If rising timing of this waveform is entered to the input "R" of the RS type flip-flop FF, then the output "Q" of this RS type flip-flop FF is reset from "H" to "L" (at timing "t3" of FIG. 6(c)), which turns OFF the upper-sided power MOSFET (Q1) via the OR gate OR2 and the driver DRV (refer to FIG. 6(c)), so that the upper-sided power MOSFET (Q2) is again brought into a sleep state (at this time, both lower-sided power MOSFET (Q2) and PWM oscillator "PWM" have already been brought into OFF states, refer to FIG. 6(d) and FIG. 6(j)). Since the above-described operation is carried out, at a midpoint voltage "Vx" between the upper-sided and lower-sided power MOSFETs (Q1) and (Q2), as shown in FIG. 6(a), a single switching operation of the upper-sided power MOSFET (Q1) is carried out.

The light load condition when the upper-sided power MOSFET (Q1) is under the sleep state may be confirmed by detecting a current of the inductor "L" in a periodic manner. As a consequence, the current of the inductor "L" is detected by employing the differential amplifier AMP in such a form of a difference voltage between the output voltage Vout and the output voltage VoCR of the second CR smoothing filter; this detected voltage (VoCR−Vout=ESR×Io) is compared with a light load setting voltage "ΔI" by the comparator "CMP" and if (VoCR−Vout=ESR×Io)<ΔI, then an output "Isense" of the comparator CMP is judged as "L" (at timing "t4" of FIG. 6(h)), and then, is set to the input "D" of the D type flip-flop DFF. On the other hand, at this time, since the upper-sided/lower-sided power MOSFETs (Q1) and (Q2) and the PWM oscillator "PWM" have been turned OFF (stopped), a supply of electric power to the load is performed by utilizing energy stored in the output capacitor Co. As a result, as shown in FIG. 6(b), since the terminal voltage of the output capacitor Co, namely, the output voltage Vout is decreased with such an inclination defined by Io/Co, this drop voltage is compared with a predetermined voltage (in this case, reference voltage "Vref") by the output voltage detecting circuit VODET; and if such a falling timing (namely, timing "t4" of FIG. 6(f)) at which the output DETout of the output voltage detecting circuit VODET is switched from "H" to "L" is inputted to the input "T" of the D type flip-flop DFF, then the output "Q" of the D type flip-flop DFF is again set to "L" (refer to FIG. 6(i)) so as to define the light load state (namely, sleep state). As a result, the upper-sided and lower-sided power MOSFETs (Q1) and (Q2) are turned OFF (stopped) and the PWM oscillator "PWM" is turned OFF (stopped) (refer to FIG. 6(c), FIG. 6(d), FIG. 6(j)), and are brought into sleep states. This sleep period is ended until the output voltage Vout is dropped and then reaches the lower limit threshold value of the transient variation detecting circuit TVD. Since an action of "α100" occurs at this time, a series of the above-described operations is repeatedly carried out, so that the light load state is maintained. As apparent from the foregoing descriptions, even when this action of "α100", if the light load condition is not established, then the control operation in the case of the abrupt load change is carried out.

The above-described operations have been explained by employing such an initial condition that the timing at which the signal is entered to the input "T" of the D type flip-flop DFF corresponds to the falling timing of the output DETout of the output voltage detecting circuit VODET when the previous load condition is the light load state. When the previous load condition is any load state other than the light load state, the timing at which the signal is entered to the input "T" of the D type flip-flop DFF corresponds to the falling timing of the output of the PWM oscillator "PWM", the operations of which will be omitted.

Figure 7:
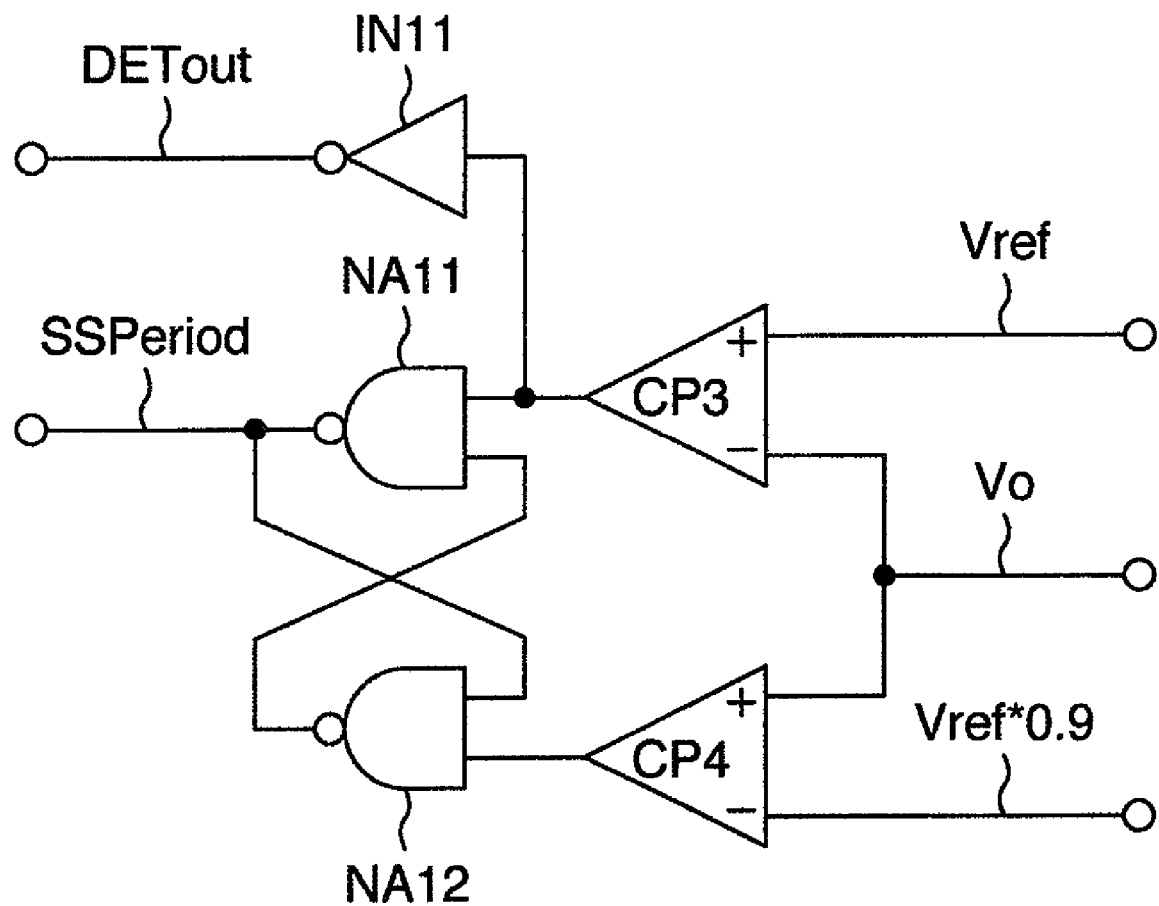
FIG. 7 is a detailed circuit diagram for showing an output voltage detecting circuit employed in the power supply apparatus of FIG. 1.

One detailed embodiment as to the output voltage detecting circuit VoDET employed in this exemplification is arranged by, as shown in FIG. 7, two sets of comparators "CP3" and "CP4", and such a flip-flop constructed of NAND gates "NA11" and "NA12." The above-explained output voltage detecting circuit VoDET is designed to output such as signal "SSPeriod" for setting the soft start period when the power supply apparatus is initiated. In addition, since an inverter "IN11" is added to the above-described circuit arrangement shown in FIG. 7, such a signal "DETout" designed for acquiring change information of an output voltage during the light load condition is outputted.

In accordance with the above-described method, since the upper-sided power MOSFET (Q1) is turned ON one time when the power supply apparatus is driven under light load condition, the output voltage "Vout" is recovered to the predetermined voltage. Thereafter, both the upper-sided and lower-sided power MOSFETs (Q1) and (Q2) are turned OFF, and also, the control circuit such as the PWM oscillator "PWM" and the like is turned OFF, which is brought into the sleep state. As a result, the switching losses of the power MOSFETs (Q1) and (Q2) can become the lowest loss, value, and the control power can also be reduced. When the load is abruptly changed, the PWM duty ratio "a" for driving the upper-sided/lower-sided power MOSFETs (Q1) and (Q2) can be forcibly set to either 0% or 100% by operating the transient variation detecting circuit TVD, which is different from the control operation during the light load state. As a result, even when the output voltage Vout is rapidly increased, or rapidly decreased, the variation of the output voltage Vout can be suppressed as much as possible. As a consequence, the compatibility as to the improvement in the efficiencies during the light load driving operation of the power supply apparatus and the fast response thereof can be established.

Embodiment 2

Figure 8:
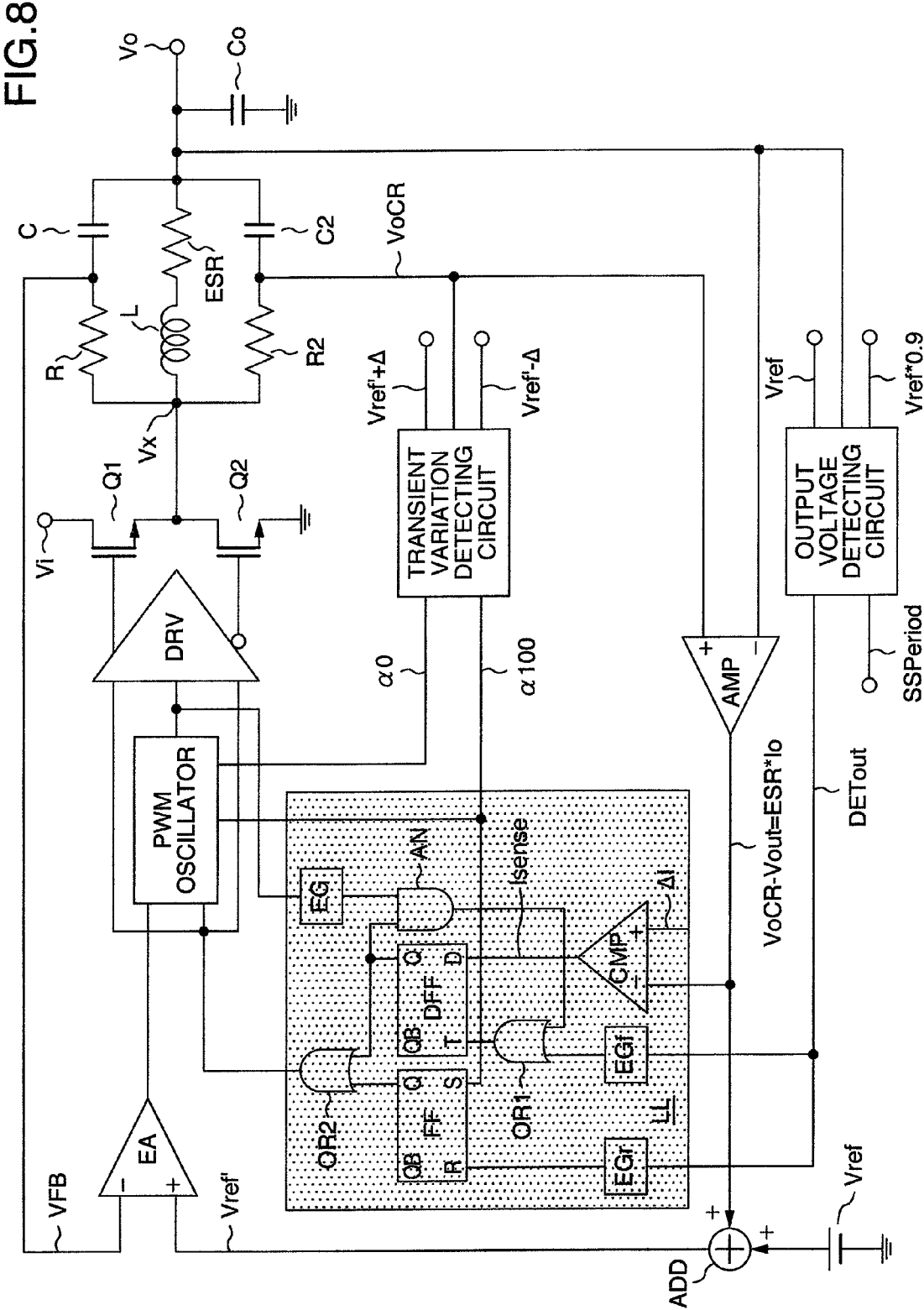
FIG. 8 is a circuit block diagram of a power supply apparatus according to an embodiment 2 of the present invention.

FIG. 8 is a circuit block diagram of a power supply apparatus according to an embodiment 2 of the present invention. It should be noted that the same reference numerals shown in FIG. 1 will be employed as those for denoting the same, or similar structural elements represented in FIG. 8. The power supply apparatus shown in FIG. 8 has the below-mentioned different points from those of FIG. 1: That is, as the stopping (turn-OFF) signal for turning OFF both the lower-sided power MOSFET (Q2) and the PWM oscillator "PWM", the output "Q" of the D type flip-flop DFF is not employed, but the output of the OR gate OR2 is employed which is similarly used to the upper-sided power MOSFET (Q1). In this case, when the power supply apparatus is driven under light load condition, the upper-sided power MOSFET (Q1) is turned ON one time so as to recover the output voltage to the predetermined voltage, which is similar to that of FIG. 1. However, in accordance with the embodiment 2, since the lower-sided power MOSFET (Q2) is turned ON after the upper-sided power MOSFET (Q1) has been turned OFF, such a portion which becomes conductive by a parasitic diode of the lower-sided power MOSFET (Q2) constitutes the turn-ON operation of the lower-sided power MOSFET (Q2). As a consequence, although switching losses of the power MOSFETs (Q1) and (Q2) are slightly increased, a reducing effect of control power may be achieved which is similar to that of FIG. 1, so that the compatibility as to the power saving effect during the light load condition of the power supply apparatus and the fast response thereof can be established.

In the above-described embodiments 1 and 2, the detection of the inductor current has been carried out by employing the second CR smoothing filter. Alternatively, the inductor current (otherwise, load current) may be similarly detected by utilizing a sense resistance method, a current transformer method, and the like. In this alternative case, since a voltage conversion value about current information acquired by the above-described sense resistance method, or current transformer method is connected to one input (−) of the comparator CMP shown in FIG. 1 and FIG. 8, the inductor current may be detected. For example, in order to detect the current information, the following circuit arrangement is additionally required: That is, while a differential amplifier is newly provided, an output of this differential amplifier is applied to one input (−) of the comparator CMP. Also, the magnitude of the light load setting voltage "ΔI" is also required to be changed, depending upon detection sensitivities of the respective current detection methods.

The processings executed when the power supply apparatus of the present invention is driven under the light load condition are itemized as follows:

(1) If the current of the inductor "L" is detected and then the present load condition is judged as the light load based upon the detected inductor current, then both the upper-sided/lower-sided power MOSFETs (Q1) and (Q2) and the PWM oscillator "PWM" are turned OFF so as to be brought into the sleep states.

(2) If the output voltage Vout is lowered and then the lowered output voltage reaches the lower limit threshold value, then the upper-sided power MOSFET is turned ON so as to recover the output voltage. If the recovered output voltage reaches the predetermined voltage, then the upper-sided power MSFET is turned OFF so as to be again brought into the sleep state. In the above-described embodiment 1 and 2, a series of the above-described processings has been realized by way of the analog control operations. Next, a description is made of other embodiments capable of realizing the above-described processings by way of digital control operations.

Embodiment 3

Figure 9:
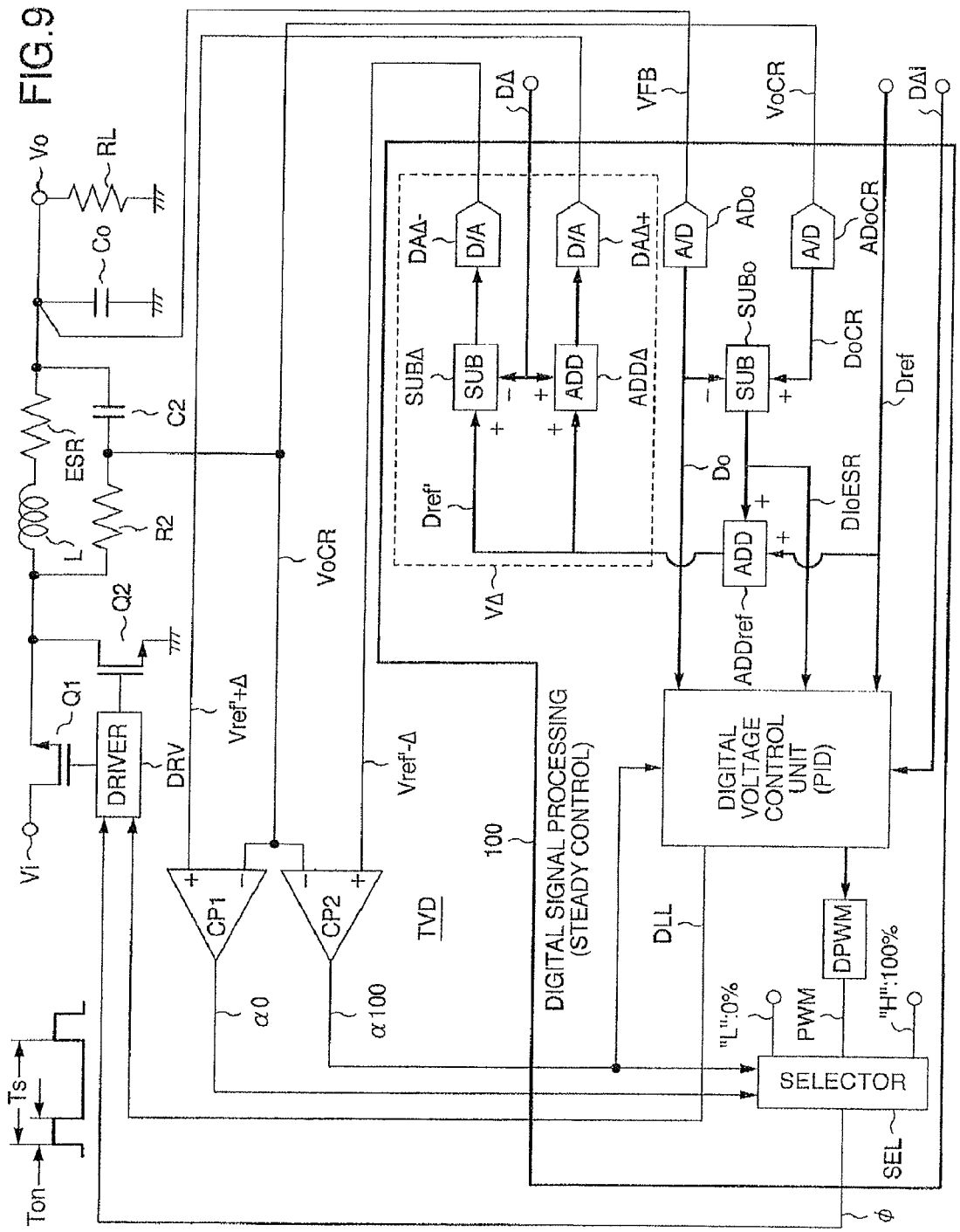
FIG. 9 is a circuit block diagram of a power supply apparatus according to an embodiment 3 of the present invention.

FIG. 9 shows an embodiment 3 of the present invention in which the power supply apparatus indicated in FIG. 1 is controlled in a digital manner. In FIG. 9, in order to replace circuits and functions of FIG. 1 by digitally-operable circuits and functions, the below-mentioned seven, or more technical ideas are conducted: That is, 1) the converted voltage "VFB" which has been fed back from the output of the first CR smoothing filter constituted by the capacitor C and the resistor R is obtained from the output terminal "Vo."

2) the transient variation detecting circuit TVD arranged by the comparators CP1 and CP2 is separately provided with respect to a digital signal processing unit 100 for performing a high-speed processing.

3) the new reference voltage "Vref" generated by operating the differential amplifier AMP and the adder ADD is replaced by such a new digital reference voltage signal "Dref" which is generated in such a manner that in the digital processing unit 100, after the converted voltage "VFB" (will also be referred to as output voltage "Vout") and the voltage VoCR are converted into digital signals by A/D converters "ADo" and "ADoCR", the digital signals are subtracted from each other by a subtracter "SUBo" so as to obtain a digital inductor current signal "DIoESR", and then, this digital inductor current signal "DIoESR" is added to a digital reference voltage signal "Dref" by an adder "ADDref."

4) a voltage "Vref'±Δ" is generated by a Vref'±Δ generating circuit "VΔ" provided in the digital signal processing unit 100 based upon the new digital reference voltage signal "Dref'" and a digital transient variation detection width signal "DΔ."

5) the function of the output voltage detecting circuit "VODET" is realized by a digital voltage control means "DVC" (not shown) employed in the digital signal processing unit 100.

6) a content of processings executed by the error amplifier "EA" with employment of the converted voltage "VFB", and digital reference voltage signal "Dref" corresponding to the reference voltage "Vref" is obtained by the digital voltage control means "DVC" provided in the digital signal processing unit 100, and 7) the PWM oscillator "PWM" is arranged by a digital PWM oscillator "DPWM" and a selector "SEL", or the like.

Moreover, in order that processings when the power supply apparatus of the present invention is driven under the light load condition are performed by the digital voltage control means DVC, the below-mentioned various signals are additionally acquired by this digital voltage control means DVC: That is, the digital voltage control means DVC acquires a digital light load setting voltage signal "DΔI", the signal "α100", and the digital inductor current signal "DIoESR"

equal to the subtraction result of the subtracter "SUBo." Furthermore, in order to output a calculation result to the driver "DRV", a digital light load output signal "DLL" is additionally supplied to the digital voltage control means "DVC." It should also be understood that since circuits and operations of the above-described digital control power supply apparatus have been described in detail in JP-A-2008-113542, the contents of which may be taken into account.

Figure 10:
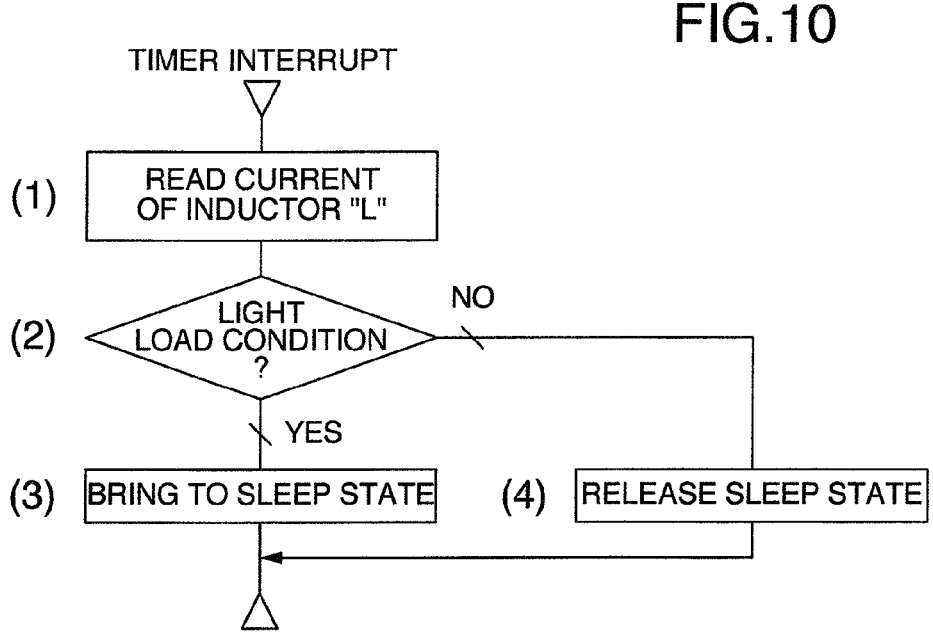
FIG. 10 is a flow chart for describing a control algorithm of a timer interrupt processing executed in the power supply apparatus shown in FIG. 9.
Figure 11:
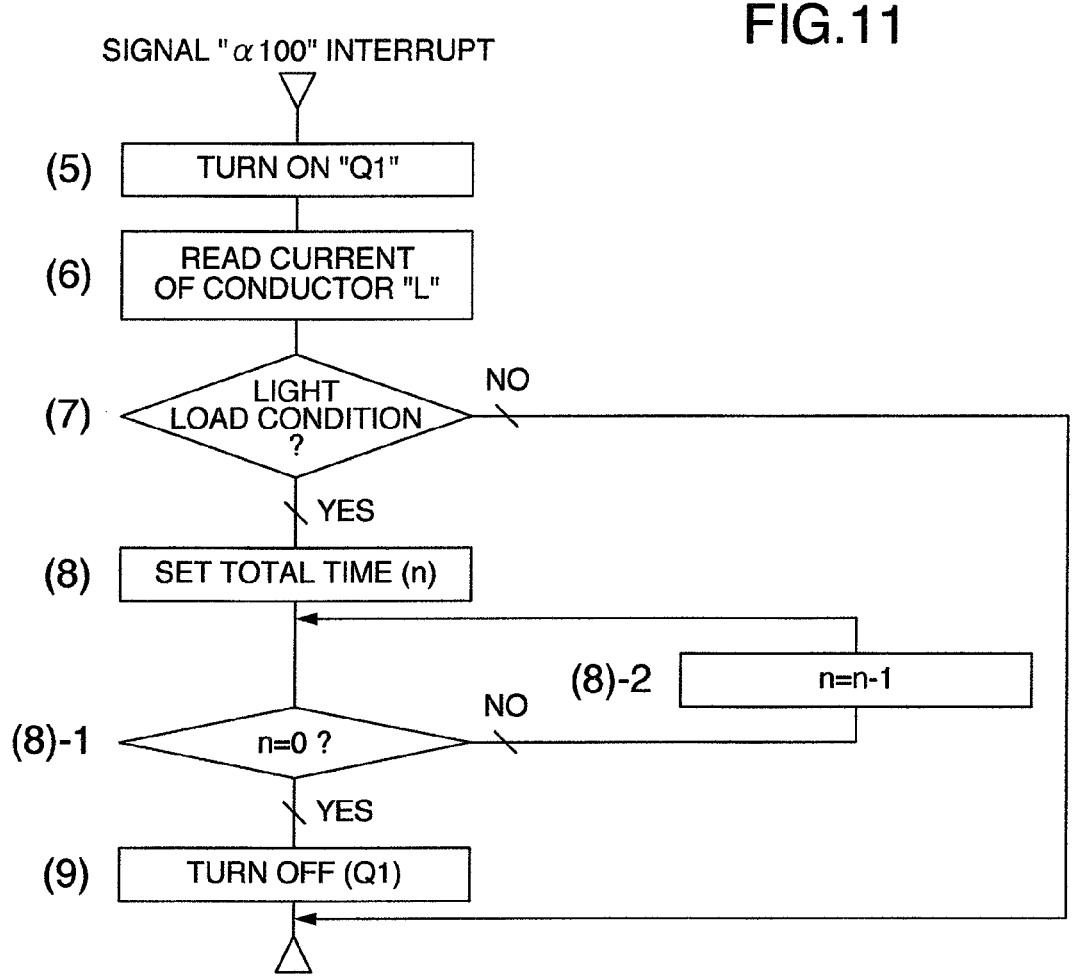
FIG. 11 is a flow chart for describing a control algorithm of a signal "α100" interrupt processing executed in the power supply apparatus of FIG. 9.

In the digital control power supply apparatus of FIG. 9, a description is made of only processings executed when the digital control power supply apparatus is driven under the light load condition by employing control algorithms represented in FIG. 10 and FIG. 11.

A detecting processing and a judging processing as to a light load condition are carried out based upon the control algorithm shown in FIG. 10. In the control algorithm of FIG. 10, when a timer interrupt is produced in a periodic manner, (1) a current of the inductor "L" is read; (2) a comparing operation is performed between a large/small relationship between a digital inductor current signal "DIoESR" corresponding to the current of the inductor "L" and the digital light load setting voltage signal "DΔI", if the present operation condition is judged as a light load condition, (3) the upper-sided/lower-sided power MOSFETs (Q1) and (Q2), and the DPWM oscillator "DPWM" are turned OFF (stopped) via the driver "DRV" by employing the digital light load output signal "DLL" so as to be brought into sleep states, and then, the detecting/judging process operations are accomplished. To the contrary, if the present condition is judged as any other conditions than the above-described light load condition, (4) the sleep states are released, and then, the detecting/judging process operations are accomplished. Now, in such a case that the present load condition is brought into the light load condition, since both the upper-sided/lower-sided power MOSFETs (Q1) and (Q2) have been turned OFF, the supply of the electric power to the load is carried out by utilizing the energy stored in the output capacitor "Co." As a result, since the terminal voltage of the output capacitor "Co", namely, the output voltage Vout is gradually lowered, when this output voltage Vout reaches the lower limit threshold value (Vref'−Δ) of the transient variation control circuit TVD, an interrupt of the signal "α100" is produced. In response to this interrupt of the signal "α100", processings of the control algorithm shown in FIG. 11 is executed. In FIG. 11, when the interrupt of the signal "α100" is produced, (5) the upper-sided power MOSFET (Q1) is turned ON via the driver "DRV" by employing the digital light load output signal "DLL." Next, (6) a current of the inductor "L" is read; (7) a judgement is made whether the signal "α100" is an action under light load condition, or an action when a load is abruptly increased; in such a case that the interrupt of the signal "α100" is judged as the action under the light load condition, (8), (8)-1, and (8)-2 when a predetermined time during which the output voltage is recovered to a preselected voltage is measured by decrementing a total count time (n) of a counter (not shown) until this total count time (n) becomes 0, and then, when the count decrementing operation is accomplished, (9) the upper-sided power MOSFET (Q1) is turned OFF via the driver "DRV" by employing the digital light load output signal "DLL", and then, the processings of the control algorithm are accomplished. Also, in such a case that the interrupt of the signal "α100" is judged as the action when the load is abruptly changed, no specific process operation is carried out, and then, the processings of the control algorithm are accomplished. Under the light load condition, a series of the above described processings is carried out.

Even when the above-described control algorithms are replaced by the below-mentioned methods, these control algorithms may be similarly realized.

(1) Instead of the timer interrupt of FIG. 10, while the total time employed in FIG. 11(8) is set, such a method for determining a periodic time interval may be employed in a calculation processing. As a result, the timer interrupt may be eliminated.

(2) Instead of the interrupt of the signal α100 shown in FIG. 11, another method may be employed in which the output voltage Vout (in this case, converted voltage VFB) is read in a cyclic manner, and every time the output voltage Vout is read, this read output voltage Vout is compared with the lower limit threshold value of the transient variation detecting circuit TVD. In this alternative case, if the output voltage Vout is compared with the previously-acquired lower limit threshold value of the transient variation detecting circuit TVD, there are some possibilities that the output voltage starts to be recovered from such a voltage which is further lower than this output voltage due to a relationship of digital processing speeds. As a consequence, another value which is different from the lower limit threshold value of the transient variation detecting circuit TVD is necessarily required so as to be compared with the output voltage.

(3) Instead of the method for recovering the output voltage to the predetermined voltage by counting the total time of (8) of FIG. 11, another method may be employed in which while the output voltage Vout is read in a cyclic manner, every time this output voltage Vout is read, the read output voltage Vout is compared with the predetermined voltage. Also, in this case, as previously described in the above item (2), a predetermined voltage value is required to be set by considering digital processing speeds.

In accordance with this digital control operation, when the digital power supply apparatus is driven under the light load condition, the upper-sided power MOSFET (Q1) can be turned ON one time and the control operations of the control circuit such as the DPWM oscillator "DPWM" can be stopped. As a result, the switching losses of the power MOSFETs (Q1) and (Q2) can become the lowest loss value, and the control power can also be reduced. The control operation when the load is abruptly changed cannot be deteriorated. As a consequence, the compatibility as to the improvement in the efficiencies during the light load driving operation of the digital power supply apparatus and the fast response thereof can be established.

Also, in accordance with the digital control operation, the setting value of the digital light load setting voltage signal "DΔI" can be readily changed. As a result, the control operations may be carried out in a fine mode, for example, a range when the digital power supply apparatus is driven under the light load condition may be arbitrarily set. Accordingly, there are some possibilities that the reducing effect of the control power when the digital power supply apparatus is driven under the light load condition may be furthermore improved, as compared with the power reducing effect by the analog control operation.

Embodiment 4

Figure 12:
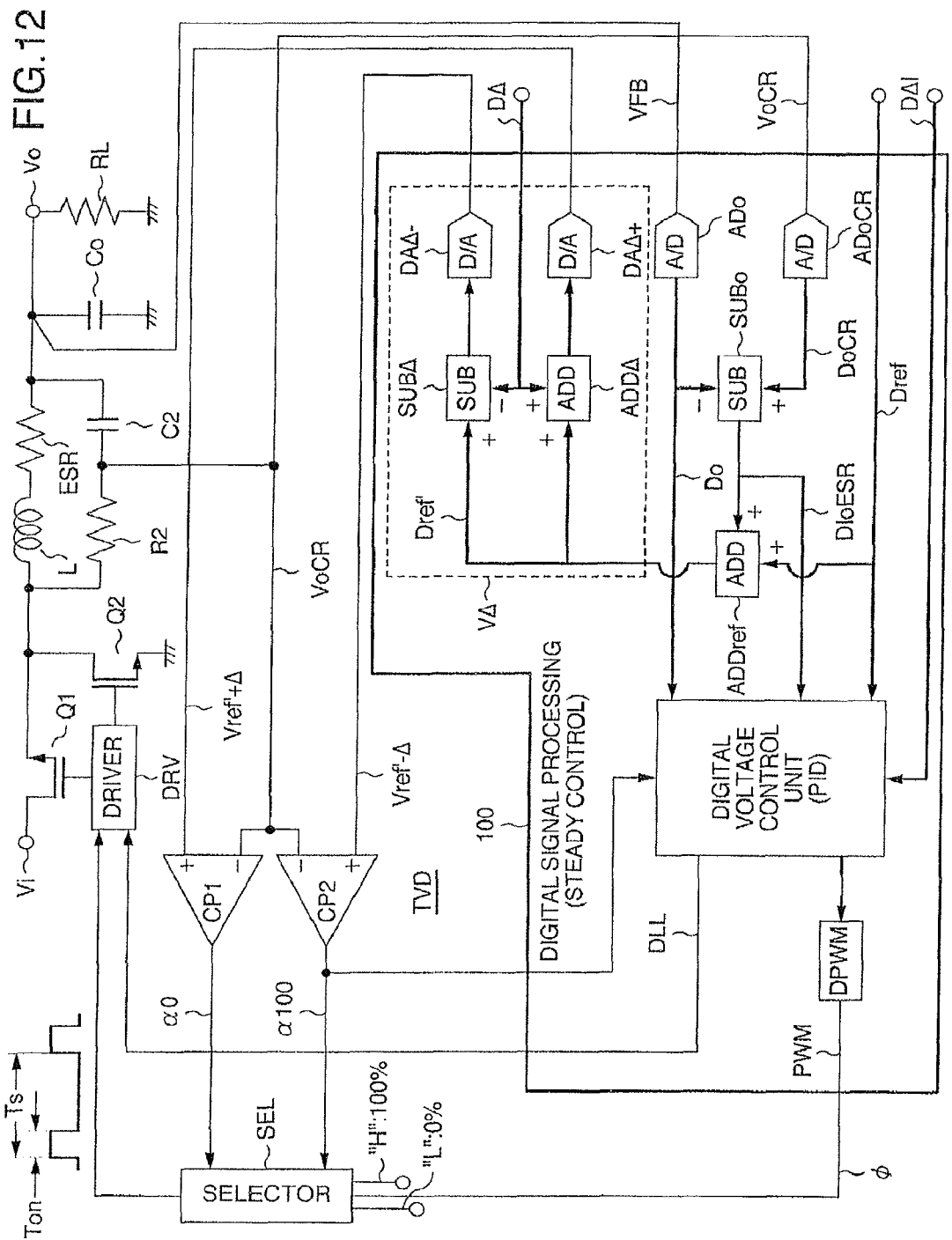
FIG. 12 is a circuit block diagram of a power supply apparatus according to an embodiment 4 of the present invention.

Also, if DSP cores, processors, special-purpose hardware, which are commercially available, may be employed as the digital signal processing unit 100 of FIG. 9, then another power supply apparatus shown in FIG. 12, according to an embodiment mode 4 of the present invention, may be realized by additionally providing the comparators CP1 and CP2 and the selector SEL of the present invention by external circuit components. It should also be noted that although the Vref'±Δ generating circuit "VΔ" has been realized by the digital signal processing unit 100, if this Vref'±Δ generating circuit "VΔ" cannot be realized, then this generating circuit "VΔ" may also be alternatively realized by an external circuit. In this alternative case, since this external circuit may be readily realized, this external circuit will be omitted.

Since the technical ideas as to the processing when the power supply apparatuses are driven under the light load conditions may constitute important factors in the present invention, these technical ideas of the present invention are not limited only to the above-described embodiments.

Embodiment 5

Figure 13:
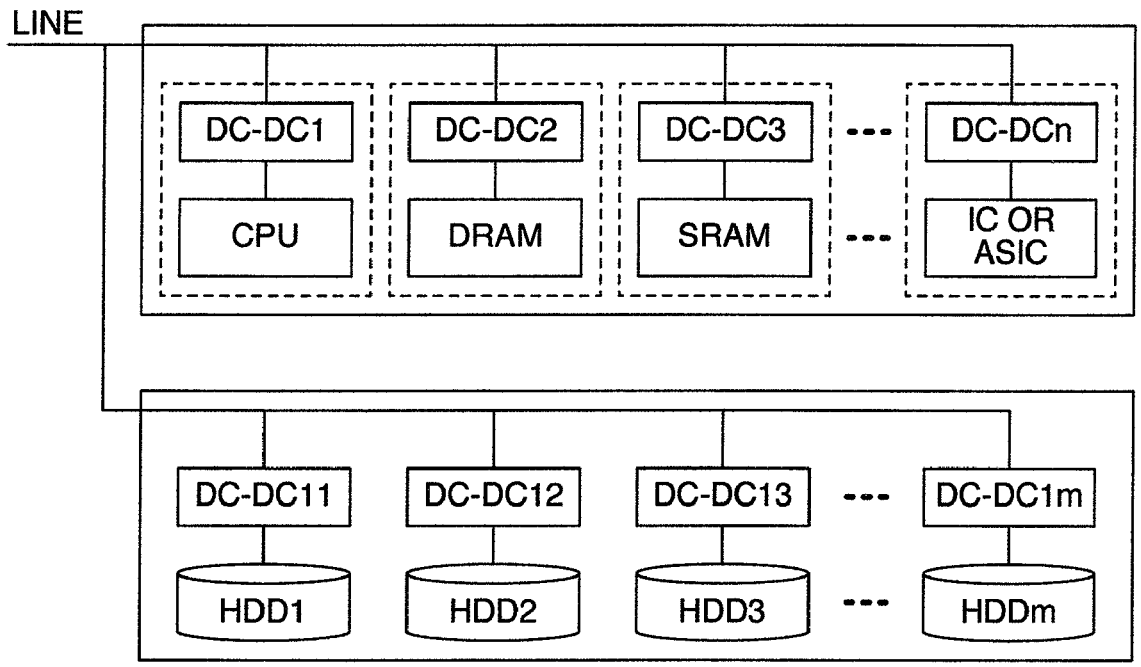
FIG. 13 is an explanatory diagram for explaining an information processing-purpose power supply apparatus of an HDD apparatus on which the power supply apparatus of the present embodiment has been mounted.

FIG. 13 is an embodiment 5 of the present invention, in which the power supply apparatuses of the present invention have been applied an HDD (Hard Disk Drive) apparatus. In this HDD apparatus, DC-to-DC converters "DC-DC1" through "DC-DCn" corresponding to the above-described power supply apparatuses described in the embodiment 1 through the embodiment 4 supply a plurality of electric power having different voltages to respective circuit boards which are arranged by a processor CPU for controlling storing operations of data to the HDD apparatus, a high-speed large-capacity memory DRAM, an SRAM, and the like. The plurality of electric power having the different voltages are suitably selected with respect to the subject circuit boards. It should also be understood that separately provided power supply apparatuses "DC-DC11" through "DC-DC1m" are applied to HDD apparatuses "HDD1" through "HDDm", respectively.

Embodiment 6

Figure 14:
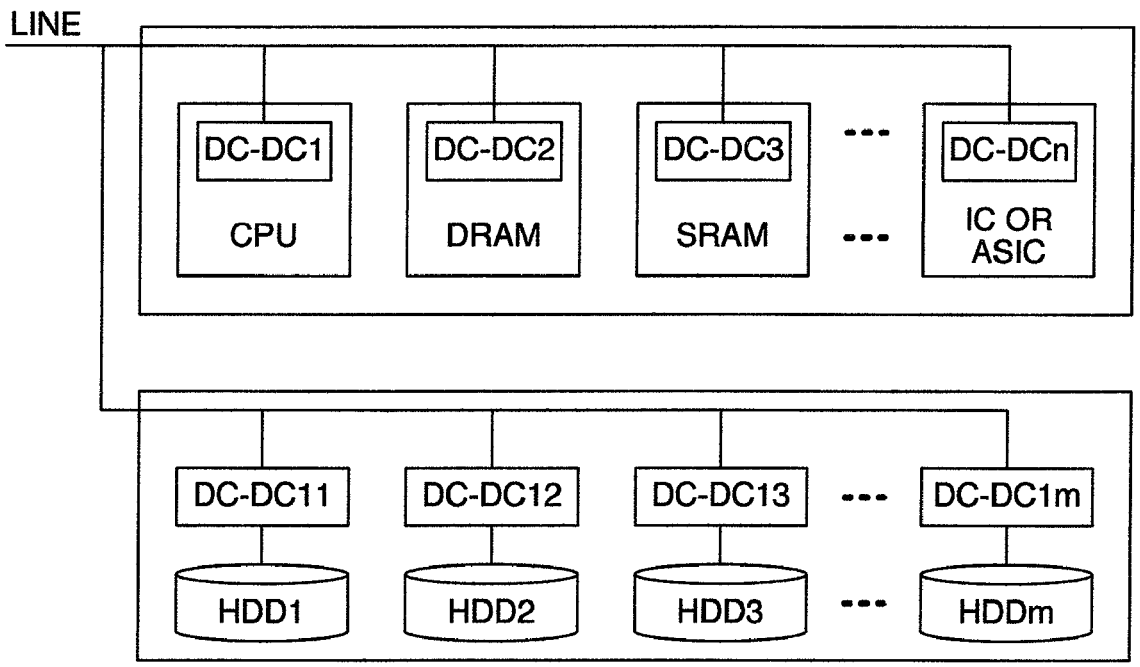
FIG. 14 is an explanatory diagram for explaining another information processing-purpose power supply apparatus of an HDD apparatus on which the power supply apparatus of the present embodiment has been mounted.

FIG. 14 shows an embodiment 6 of the present invention, in which DC-to-DC converters "DC-DC1" through "DC-DCn" corresponding to the above-described power supply apparatuses described in the embodiment 1 through the embodiment 4 are arranged on either the same chip or the same package, which is provided for a processor CPU for controlling storing operations of data to the HDD apparatus, a high-speed large-capacity memory DRAM, an SRAM, and the like; and these DC/DC converters "DC-DC1" to "DC-DCn" supply a plurality of electric power having different voltages with respect to suitably selected subject circuit boards. Since the DC/DC converters "DC-DC1" to "DC-DCn" are mounted in the above-explained manner, distances of power supply wiring lines between these DC/DC converters "DC-DC1" to "DC-DCn" and such loads as the processor CPU, the high-speed large-capacity memory DRAM, the SRAM, and the like can be extremely shortened as short as possible. As a result, variations contained in output voltages when the loads for the DC/DC converters "DC-DC1" to "DC-DCn" are suddenly changed can be extremely reduced, so that there is a merit in fast response.

Although the power MOSFETs have been employed as the semiconductor switching elements in the such as IGBTs, GaN devices, and SiC (Silicon Carbide) devi above-described exemplifications, other power switching elements ces may be alternatively employed if these alternative power switching elements are arranged in on-board structures.

Also, if a power supply apparatus of the present invention is arranged on (built in) either the same chip or the same package as to a processor CPU, a high-speed large-capacity memory DRAM, an SRAM, and the like, then such a switching element, for example, a CMOS device, manufactured in the same manufacturing process for these semiconductor chips may be alternatively employed as the above-described semiconductor switching elements.

Furthermore, although the N type power MOSFET has been employed as the upper-sided semiconductor switching element (Q1) in the above-described exemplifications, a P type power MOSFET may be alternatively employed.

The power supply apparatus according to the present invention may also be applied to insulation type DC-to-DC converters, and may be alternatively applied to utilizations of various sorts of insulation type DC/DC converters such as a forward type DC/DC converter manufactured by employing a single transistor, a forward type DC/DC converter manufactured by employing two transistors, a push-pull type DC/DC converter, a half bridge type DC/DC converter, and a full bridge type DC/DC converter.

In addition, as apparent from the foregoing descriptions, the above-explained power supply apparatuses according to the embodiment 1 to the embodiment 5 may be applied to other application fields, for instance, VRMs, DC/DC converters designed for portable appliances, and general-purpose DC/DC converters, which are not shown.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. In a power supply apparatus of a back type direct current to direct current (DC-to-DC) converter driven by a first-order feedback control system, said power supply apparatus comprising:
  a power system output filter, including an inductor (L) and a capacitor (C);
  first and second capacitor-resistor (CR) smoothing filters provided at both ends of the inductor (L) of said power system output filter in a parallel manner to each other;
  a pair of power semiconductor switching elements configured to supply output power to said power system output filter;
  a driving unit configured to drive said pair of power semiconductor switching elements;
  a pulse-width modulation (PWM) oscillator configured to perform a pulse-width modulation so as to supply a drive signal to said driving unit;
  an error amplifier configured to supply an error signal between an output from said first CR smoothing filter and a new reference voltage to said PWM oscillator;
  a new reference voltage generating circuit arranged by a differential amplifier configured to produce said new reference voltage, an adder, and a reference voltage;
  a transient variation detecting circuit configured to judge a small/large relationship among an output of said second CR smoothing filter, an upper limit threshold, and a lower limit threshold;
  a selector configured to output a PWM pulse having a desirable duty ratio to said driving unit in response to a load condition based upon the output information of said transient variation detecting circuit;
  an output voltage detection circuit configured to detect information which is later employed in order to judge a soft-start operation period and a steady operation period;
  a light load processing unit configured to be operated in such a manner that reduces power consumption and improves power efficiency of the power supply apparatus at a light load, as follows:

when the power supply apparatus is driven under light load condition, and when a current of the inductor (L) is detected and the present load condition is judged as a light load condition based upon the detected current of said inductor (L), said light load processing unit brings both said pair of power semiconductor switching elements and said PWM oscillator to sleep states, when an output voltage of said power supply apparatus is lowered and thus a lowered output voltage of said second CR smoothing filter reaches the lower limit threshold of said transient variation detecting circuit, said light load processing unit turns ON an upper-sided power semiconductor switching element within said pair of power semiconductor switching elements, when the current flowing through the inductor (L) is detected and the light load has been connected, the light load processing unit recovers the output voltage of said power supply apparatus, and when the output voltage of said power supply apparatus is increased to become a predetermined voltage, said light load processing unit turns OFF said upper-sided power semiconductor switching element so as to again bring said upper-sided power semiconductor switching element to a sleep state;

a comparator configured to compare an output voltage of said differential amplifier with a light load setting voltage;

a D-type flip-flop configured to produce an output signal which defines an output state of said comparator, based upon an output pulse newly provided in said output voltage detection circuit and falling edge timing of an output pulse from said PWM oscillator, so as to turn both OFF said pair of power semiconductor switching elements and said PWM oscillator; and an RS-type flip-flop configured to generate a pulse obtained by that said RS-type flip-flop is set by a PWM pulse having a duty ratio of 100% generated when said transient variation detecting circuit detects an abrupt load change, and also, said RS-type flip-flop is configured to reset in response to rising edge timing of an output pulse which is newly provided in said output voltage detection circuit so as to turn ON only said upper-sided power semiconductor switching element within said pair of power semiconductor switching elements.

2. The power supply apparatus as claimed in claim 1, wherein:

said output pulse newly provided in said output voltage detecting circuit is produced by adding an inverter gate to said output voltage detecting circuit including two comparators and a second RS-type flip-flop.

3. The power supply apparatus as claimed in claim 1, wherein an off signal for turning OFF said pair of power semiconductor switching elements and said PWM oscillator is obtained from an OR signal obtained by OR-gating the output signal of said D-type flip-flop and the output signal of said RS-type flip-flop.

4. The power supply apparatus as claimed in claim 1 wherein the PWM oscillator comprises a one-shot multivibrator.

* * * * *